United States Patent [19]
Pelka et al.

[11] Patent Number: 6,134,092
[45] Date of Patent: Oct. 17, 2000

[54] ILLUMINATION DEVICE FOR NON-EMISSIVE DISPLAYS

[75] Inventors: David G. Pelka, Los Angeles; John M. Popovich, Del Mar; Thomas W. Dowland, Jr., Fountain Valley, all of Calif.

[73] Assignee: Teledyne Lighting and Display Products, Inc., Hawthorne, Calif.

[21] Appl. No.: 09/057,199

[22] Filed: Apr. 8, 1998

[51] Int. Cl.[7] .................................................. F21V 7/04
[52] U.S. Cl. ........................................... 361/31; 361/800
[58] Field of Search .............................. 364/26, 27, 29, 364/800, 31, 545, 326, 330, 511

[56] References Cited

U.S. PATENT DOCUMENTS

| | | |
|---|---|---|
| Re. 33,987 | 7/1992 | Suzawa . |
| 1,734,834 | 11/1929 | Steward et al. ......................... 362/300 |
| 2,448,244 | 8/1948 | Arnold ...................................... 40/546 |
| 2,761,056 | 8/1956 | Lazo ......................................... 362/26 |
| 2,907,869 | 10/1959 | Hudson et al. ............................ 362/27 |
| 3,223,833 | 12/1965 | Protzmann ................................. 362/26 |
| 3,300,646 | 1/1967 | Casebeer ................................. 250/228 |
| 3,349,234 | 10/1967 | Schwarz .................................... 362/26 |
| 3,497,686 | 2/1970 | Young ....................................... 362/31 |
| 3,539,796 | 11/1970 | Zychal .................................... 362/553 |
| 3,586,851 | 6/1971 | Rudolph ................................... 362/293 |
| 3,610,941 | 10/1971 | West ................................... 250/227.21 |
| 3,752,974 | 9/1973 | Baker et al. ............................. 362/31 |
| 3,754,130 | 8/1973 | Stone et al. .............................. 362/29 |
| 3,892,959 | 7/1975 | Pulles ....................................... 362/31 |
| 3,957,351 | 5/1976 | Stockwell ................................ 349/62 |
| 4,011,001 | 3/1977 | Moriya ..................................... 349/65 |
| 4,043,636 | 8/1977 | Eberhardt et al. ....................... 349/65 |
| 4,115,994 | 9/1978 | Tomlinson .............................. 368/241 |
| 4,118,110 | 10/1978 | Saurer et al. ............................ 249/61 |
| 4,183,628 | 1/1980 | Laesser et al. .......................... 349/65 |
| 4,195,915 | 4/1980 | Lichty et al. ............................. 349/11 |
| 4,212,048 | 7/1980 | Castleberry ............................... 362/19 |
| 4,252,416 | 2/1981 | Jaccard .................................... 349/65 |
| 4,257,084 | 3/1981 | Reynolds ................................. 362/31 |
| 4,392,750 | 7/1983 | Mettler ................................... 368/228 |
| 4,440,474 | 4/1984 | Trcks ....................................... 349/63 |

(List continued on next page.)

FOREIGN PATENT DOCUMENTS

| | | |
|---|---|---|
| 0 403 764 A1 | 12/1990 | European Pat. Off. . |
| 0 442 529 A2 | 8/1991 | European Pat. Off. . |
| 495 273 | 7/1992 | European Pat. Off. . |
| 0 531 939 A1 | 3/1993 | European Pat. Off. . |
| 0 733 928 A2 | 9/1996 | European Pat. Off. . |
| 1 450 285 | 11/1966 | France . |
| 363 3203 | 9/1986 | Germany . |
| 382 5436 | 7/1988 | Germany . |
| 63-55503 | 3/1988 | Japan . |
| 63-206713 | 8/1988 | Japan . |
| 2-143202 | 6/1990 | Japan . |
| 2 283 849 | 5/1995 | United Kingdom . |
| WO 92/13232 | 8/1992 | WIPO . |
| WO 97/30431 | 8/1997 | WIPO . |

OTHER PUBLICATIONS

*3M Optical Systems*, Brightness Enhancement Film (BEF), 2 pgs., 1993.

*Primary Examiner*—Sandra O'Shea
*Assistant Examiner*—Hargobind S. Sawhney
*Attorney, Agent, or Firm*—Knobbe, Martens Olson & Bear, LLP

[57] ABSTRACT

An illumination device comprises a waveguide having a peripheral edge. A series of point light sources are mounted in spaced relationship adjacent a peripheral portion of the waveguide. A series of diffusive reflective surfaces, preferably formed by posts, are disposed adjacent the peripheral portion of the waveguide, between pairs of the point light sources. The diffusive reflective surfaces are oriented relative to the series of point light sources and the waveguide so as to introduce light into regions of the waveguide between pairs of the point light sources, whereby the peripheral portion of the waveguide is substantially uniformly illuminated.

29 Claims, 9 Drawing Sheets

U.S. PATENT DOCUMENTS

| | | | |
|---|---|---|---|
| 4,453,200 | 6/1984 | Trcka et al. | 362/31 |
| 4,528,617 | 7/1985 | Blackington | 362/558 |
| 4,560,264 | 12/1985 | Kitazawa et al. | 396/374 |
| 4,616,295 | 10/1986 | Jewell et al. | 362/31 |
| 4,649,462 | 3/1987 | Dabrowolski et al. | 362/2 |
| 4,706,173 | 11/1987 | Hamada et al. | 362/341 |
| 4,714,983 | 12/1987 | Lang | 362/27 |
| 4,720,706 | 1/1988 | Stine | 345/84 |
| 4,723,840 | 2/1988 | Humbert et al. | 349/68 |
| 4,735,495 | 4/1988 | Henkes | 349/62 |
| 4,737,896 | 4/1988 | Mochizuki et al. | 362/301 |
| 4,766,526 | 8/1988 | Morimoto et al. | 362/255 |
| 4,798,448 | 1/1989 | van Raalte | 349/62 |
| 4,826,294 | 5/1989 | Imoto | 368/67 |
| 4,875,200 | 10/1989 | Tillery | 368/67 |
| 4,910,652 | 3/1990 | Rhine | 362/234 |
| 4,914,553 | 4/1990 | Hamada et al. | 362/560 |
| 4,945,349 | 7/1990 | Sanai | 349/58 |
| 4,972,394 | 11/1990 | DiMarco | 368/227 |
| 4,998,804 | 3/1991 | Horiuchi | 349/64 |
| 5,008,658 | 4/1991 | Russay et al. | 345/87 |
| 5,029,045 | 7/1991 | Sanai et al. | 362/26 |
| 5,029,986 | 7/1991 | De Vaan | 349/113 |
| 5,050,946 | 9/1991 | Hathaway et al. | 385/33 |
| 5,070,431 | 12/1991 | Kitazawa et al. | 349/31 |
| 5,083,240 | 1/1992 | Pasco | 362/26 |
| 5,128,783 | 7/1992 | Abileah et al. | 349/162 |
| 5,161,041 | 11/1992 | Abileah et al. | 349/62 |
| 5,169,230 | 12/1992 | Palmer | 362/350 |
| 5,202,950 | 4/1993 | Arego et al. | 385/146 |
| 5,237,641 | 8/1993 | Jacobson et al. | 385/146 |
| 5,303,322 | 4/1994 | Winston et al. | 385/146 |
| 5,339,294 | 8/1994 | Rodgers | 368/67 |
| 5,365,411 | 11/1994 | Rycroft | 362/800 |
| 5,410,453 | 4/1995 | Ruskouski | 362/20 |
| 5,440,197 | 8/1995 | Gleckman | 313/110 |
| 5,481,637 | 1/1996 | Whitehead | 385/125 |
| 5,485,291 | 1/1996 | Qiao et al. | 349/62 |
| 5,575,549 | 11/1996 | Ishikawa et al. | 362/31 |
| 5,618,096 | 4/1997 | Parker et al. | 362/31 |
| 5,655,832 | 8/1997 | Pelka et al. | 362/296 |
| 5,684,354 | 11/1997 | Gleckman | 313/110 |
| 5,721,795 | 2/1998 | Pelka | 349/65 |
| 5,806,995 | 9/1998 | Tsushima et al. | 400/200 |
| 5,883,684 | 3/1999 | Millikan et al. | 349/65 |
| 6,007,209 | 12/1999 | Pelka | 362/30 |

ILLUMINATION DEVICE FOR NON-EMISSIVE DISPLAYS

BACKGROUND OF THE INVENTION

The present invention relates generally to a device for illuminating a display, and, more particularly, to an illumination device which uniformly injects light into an optical cavity, such as a waveguide.

Illumination devices are used to illuminate non-emissive displays, such as LCD displays for personal digital assistants or cellular phones. One type of illumination device comprises a waveguide having a plurality of light sources disposed along the periphery of the waveguide. The light sources are energized and the emitted light illuminates the waveguide.

It is highly desirable for the illumination to be bright and substantially uniform across the area of the display. However, in prior art, the intensity of the light from the light sources tends to decrease as the distance from the light source increases, thereby causing undesirable bright spots along the periphery of the display where the light sources are mounted.

Miniature fluorescent tubes are commonly used as light sources. Such tubes do not produce much heat, and thus, minimize heat build-up. However, they are not very bright. Solid state point light sources, such as LEDs, are relatively bright, but have relatively small thermal mass which causes a relatively high amount of heat build-up. Such heat build-up can cause the level of light output of the LEDs to significantly decrease over time after the LED is initially energized. Consequently, the brightness of the illumination is degraded.

In view of the foregoing, there is a need for a compact device and method for injecting light into the periphery of a waveguide such that the waveguide provides a bright, uniform illumination for the display.

SUMMARY OF THE INVENTION

The present invention comprises an illumination device utilizing a waveguide. A series of point light sources are mounted in spaced relationship adjacent a peripheral portion of the waveguide. A series of diffusive reflective surfaces are provided adjacent the peripheral portion of the waveguide between pairs of the point light sources. The diffusive reflective surfaces are oriented relative to the series of point light sources and the waveguide so as to introduce light into regions of the waveguide between pairs of the point light sources, such that the peripheral portion of the waveguide is substantially uniformly illuminated. Preferably, the diffusive reflective surfaces comprise a series of posts mounted in spaced relationship adjacent the peripheral portion of the waveguide. In the preferred embodiment, the point light sources comprises LEDs, and a heat sink is coupled to the point light sources to draw heat therefrom. An angular spectrum restrictor, such as a brightness enhancing film, is preferably included in combination with a diffuser to enhance the brightness of the output.

In accordance with another aspect of the invention, a series of diffusive reflective optical cavities are formed by diffusive reflective surfaces. Each of the cavities has an entry mouth sized to receive a point light source and an exit mouth. A point light source is mounted at each of the entry mouths. A peripheral portion of a waveguide extends along the exit mouth of the diffusive reflective optical cavity.

A further aspect of the invention comprises an illumination device utilizing an optical cavity having an output aperture and a series of diffusive reflective optical cavities, each substantially smaller than the aforesaid optical cavity. The series of optical cavities have exit mouths disposed along a side of the aforesaid optical cavity. A series of point sources of light are mounted to emit light into the series of optical cavities, respectively, whereby light is injected from the exit mouth into a peripheral portion of the optical cavity.

An additional aspect of the invention comprises a method of illuminating a waveguide. Light emitted by a first point light source is confined using diffusive reflective surfaces to reflect the light. This confining is repeated for additional point light sources. All of the confined light is spatially arranged to substantially uniformly illuminate a peripheral portion of the waveguide.

BRIEF DESCRIPTION OF THE DRAWINGS

These and other features of the invention will now be described with reference to the drawings of a preferred embodiment, which are intended to illustrate and not to limit the invention, and in which.

DETAILED DESCRIPTION OF THE PREFERRED EMBODIMENT

Figure 1A:
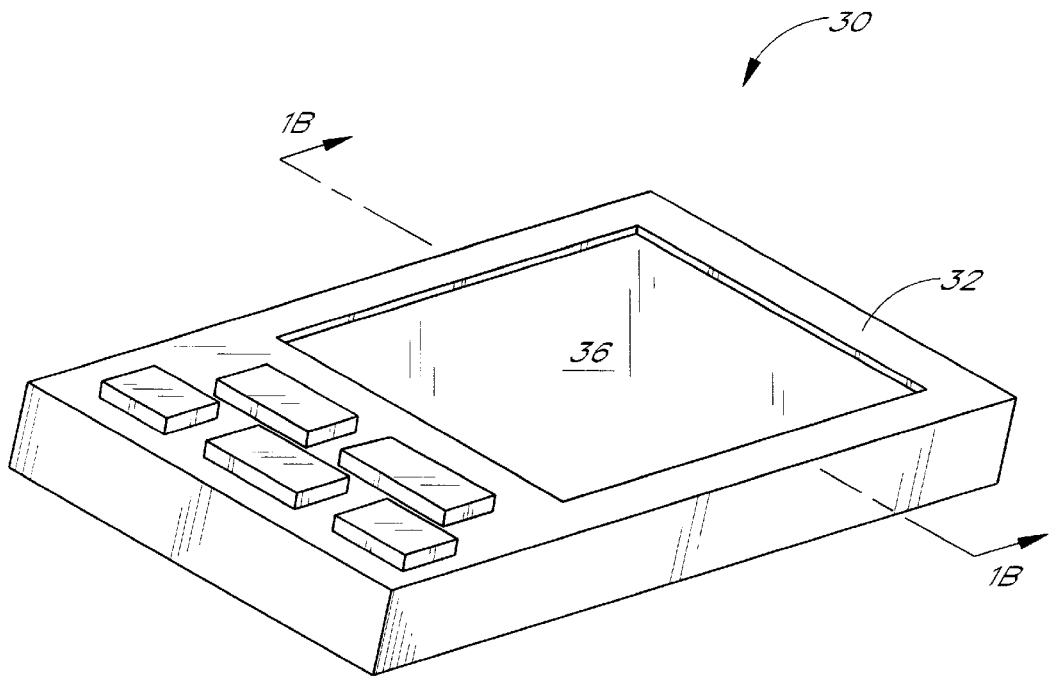
FIG. 1A is a perspective view of a personal digital assistant incorporating one embodiment of the illumination device of the present invention.
Figure 1B:
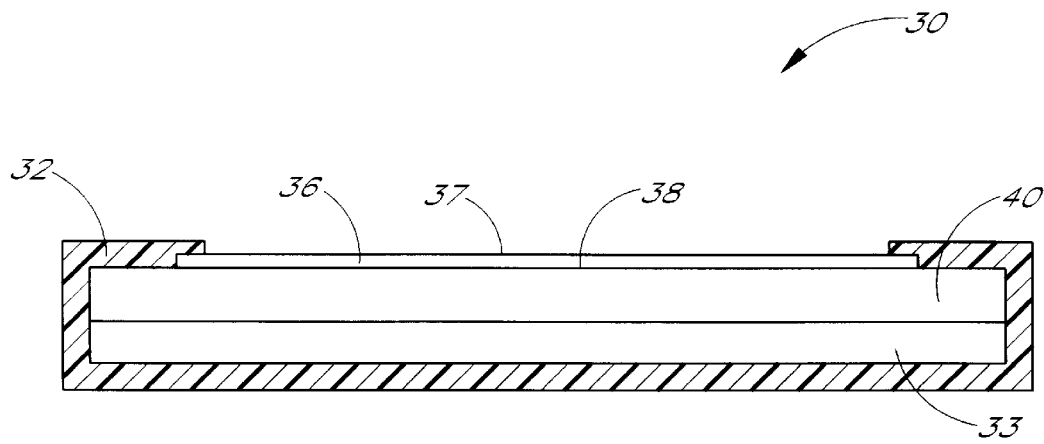
FIG. 1B is a cross-sectional view of the personal digital assistant along line 1B—1B of FIG. 1A.

With reference to FIGS. 1A and 1B, one embodiment of the illumination device 40 (FIG. 2) of the present invention is incorporated into a personal digital assistant 30 comprised of an outer housing 32 that supports a display 36, such as, for example, a liquid crystal display (LCD). As best shown in FIG. 1B, the LCD display 36 has a front face 37 and an opposed rear face 38. The illumination device 40 is located within the outer housing 32 in a juxtaposed relationship with the display 36 and is configured to act as a backlight to the display 36. In the illustrated embodiment, a set of electronic components 33 are located rearward of the illumination device 40 for providing power to the illumination device 40 and to the personal digital assistant 30 in a well known manner. While described in the context of backlighting a personal digital assistant, it will be understood that the invention may be used as a backlight for other devices, such as, for example, a cellular phone, pager, camcorder, digital camera, or global positioning system display. Moreover, although described herein as a backlight, it will be appreciated that the illumination device 40 may be also be used as an illumination device in any of a wide variety of applications, including as a front light.

Figure 2:
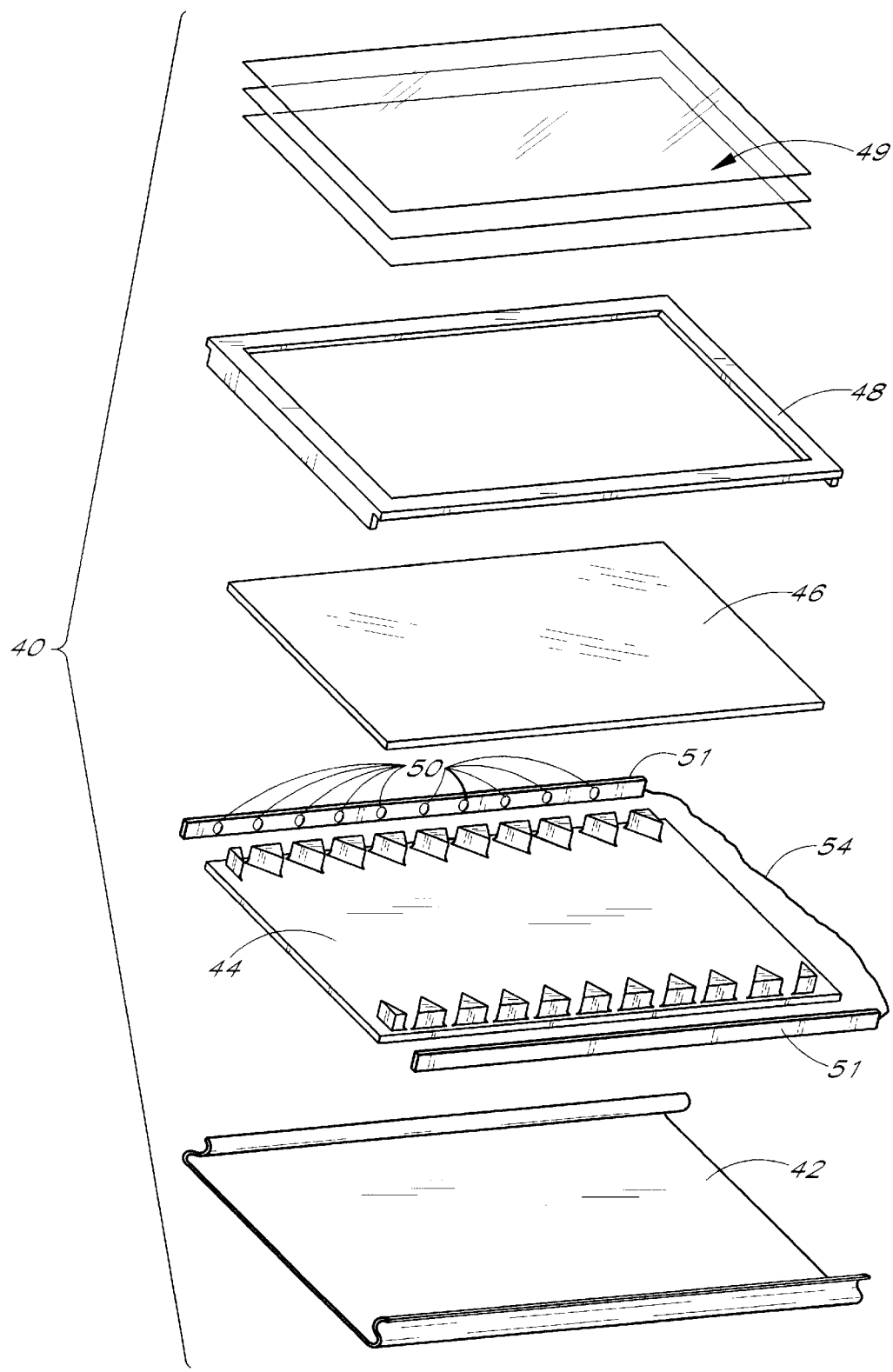
FIG. 2 is an exploded view of the illumination device of the present invention.

With reference to the exploded view of FIG. 2, the illumination device 40 comprises a plurality of components, including a heat sink 42, a light guide 44, a waveguide 46, a cover 48, and a film stack 49. A plurality of point light sources, such as light-emitting diodes (LEDs) 50, are positioned adjacent the peripheral edges of the light guide 44 and are configured to inject light into the waveguide 46, as described in more detail below. In the illustrated embodiment, each of a pair of LED strips 51, such as printed circuit boards or electrical-conductive strips, mount the LEDs 50 in a linear array with equidistant spacing. The LEDs 50 within a strip 51 are parallel connected and the two strips 51 are series connected to one another via an electrical conductor 54. The various components of the illumination device 50 are mechanically coupled to one another, as described more fully below with reference to FIGS. 11 and 12.

Figure 3:
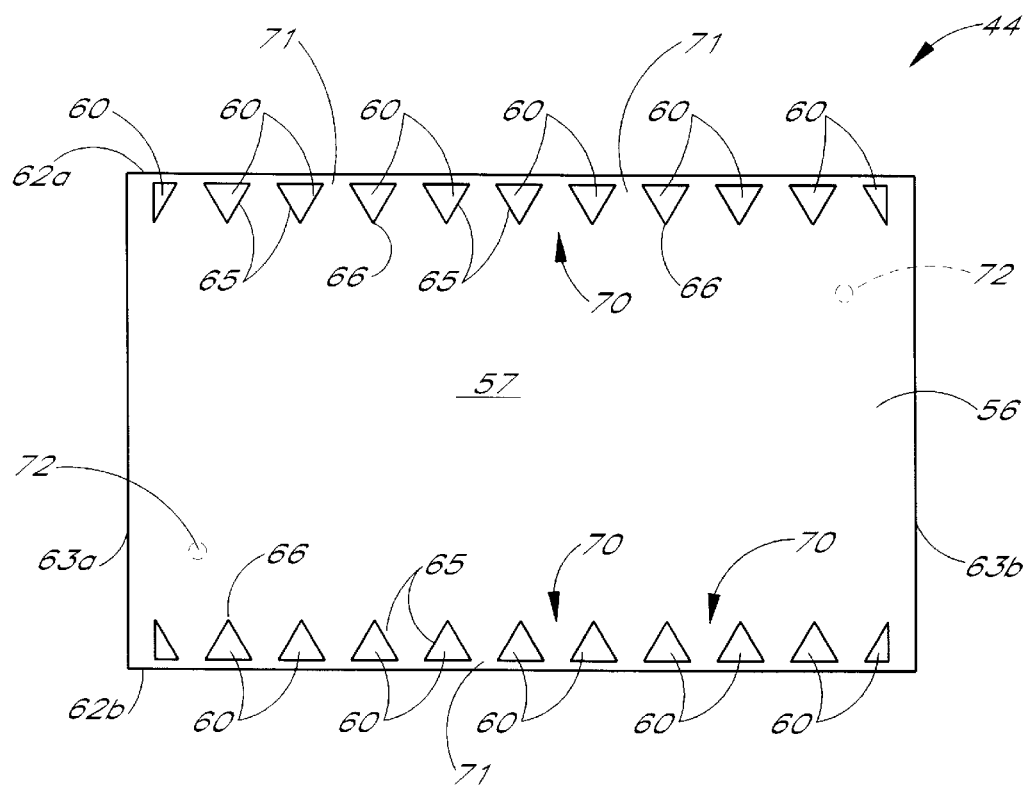
FIG. 3 is a top view of a light guide of the illumination device.
Figure 4:
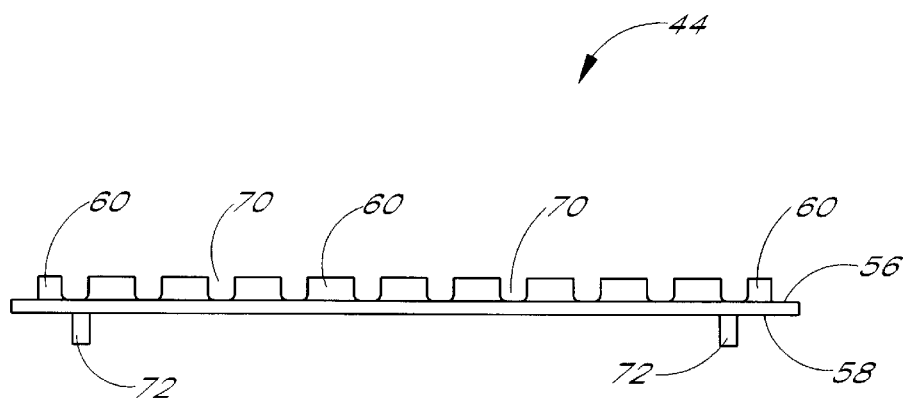
FIG. 4 is a side view of the light guide of FIG. 3.

With reference to FIGS. 3 and 4, the light guide 44 of the disclosed embodiment comprises a planar member 56 having a substantially flat top surface 57 and an opposed, substantially flat bottom surface 58 parallel thereto. The planar member 56 is rectangular-shaped so as to define a pair of substantially straight, opposed side edges 62a and 62b (referred to collectively as "side edges 62") and a pair of opposed, substantially straight end edges 63a and 63b (referred to collectively as "end edges 63"). The end edges 63 are both shorter than either of the side edges 62.

A plurality of guide members 60 are disposed in a spaced, side-by-side relationship along each of the side edges 62a and 62b of the planar member 56. In the illustrated embodiment, each of the guide members 60 comprises a post with a triangular cross-section that extends upwardly from the top surface 57 of the planar member 56. The post-shaped guide members 60 on the edge 62a will be referred to as the members 60a and those on the edges 62b will be referred to as the members 60b. The portion of the top surface 57 between the post-shaped guide members 60a and the post-shaped guide members 60b forms a waveguide receiving region.

The guide members 60 each include a pair of flat side surfaces 65 that angle toward each other and intersect to form an apex line 66 that points toward the waveguide receiving region. For clarity, the apexes 66 of the guide members 60a are designated using the suffix "a" and the apexes 66 of the guide members 60b are designated using the suffix "b." Preferably, the guide members 60a are positioned such that the apexes 66a are aligned along a first edge or boundary of the waveguide receiving region. Similarly, the guide members 60b are preferably positioned such that the apexes 66b are aligned along a second edge or boundary of the waveguide receiving region. The aforementioned side surfaces 65 of each post-shaped guide member 60 are disposed at an angle of about 45° relative to the adjacent boundary of the waveguide receiving region. The remaining surface of the post-shaped guide member 60 is parallel to the side edges 62.

In the illustrated embodiment, the top surfaces of the post-shaped guide members 60 are substantially flat and parallel to the top surface 57. Moreover, it will be understood that the side surfaces 65, while flat in the disclosed embodiment, may also be curved to form convex or concave surfaces.

With reference to FIGS. 3 and 4, the guide members 60 are spaced apart along the side edges 62 so as to define a plurality of spaces 70 between adjacent guide members 60. Each of the spaces 70 is substantially funnel-shaped so as to form a relatively narrow entry mouth 71 adjacent the side edges 62. The spaces 70 gradually widen in size moving from the entry mouths 71 toward the apexes 66 of the guide members 60 to thereby form an exit mouth between the apexes 66 adjacent the boundary of the waveguide receiving section. The exit mouths are wider than the entry mouths 71. Moreover, the entry mouths 71 of the spaces 70 are preferably each configured to receive light from one of the LEDs 50 which are mounted adjacent thereto, as described more fully below.

The top surface 57 of the planar member 56 and the side surfaces 65 of the guide members 60 are comprised of a material which diffusively reflects light impinging thereon. In one embodiment, the top surface 57 of the planar member 56 and the side surfaces 65 of the guide members 60 are coated with a diffusive reflective material. Alternately, the planar member 56 and guide members 60 may be manufactured of a diffusive reflective material. In either case, the top surface 57 and the side surfaces 65 preferably have a reflectivity of at least 90%. More preferably, the top surface 57 and the side surfaces 65 have a reflectivity of at least 94% and, most preferably, the reflectivity of the surfaces 57 and 65 is at least 99%.

The diffusive reflective material on the top surface 57 and the side surfaces 65 may comprise a coating of one or more layers of diffusely reflective tape, such as DRP™ Backlight Reflector, manufactured by W. L. Gore & Associates. DRP™ Backlight Reflector has a reflectivity of approximately 97%–99.5%, depending on the thickness of the material and the wavelength of the light. Alternatively, the reflective material could comprise a paint or coating that is applied to the top surface 57 and the side surfaces 65, such as white house paint or a more exotic material, such as the Labsphere Corporation's Spectraflect paint. Spectraflect paint's reflectivity is considerably higher than house paint, roughly 98%, while the reflectivity of a good white house paint is approximately 90%. As mentioned, the planar member 56 and the guide members 60 may also be manufactured of a diffusive reflective material, such as, for example, cycolac, which is manufactured by General Electric. Cycolac has a reflectivity of approximately 94%.

Figure 5:
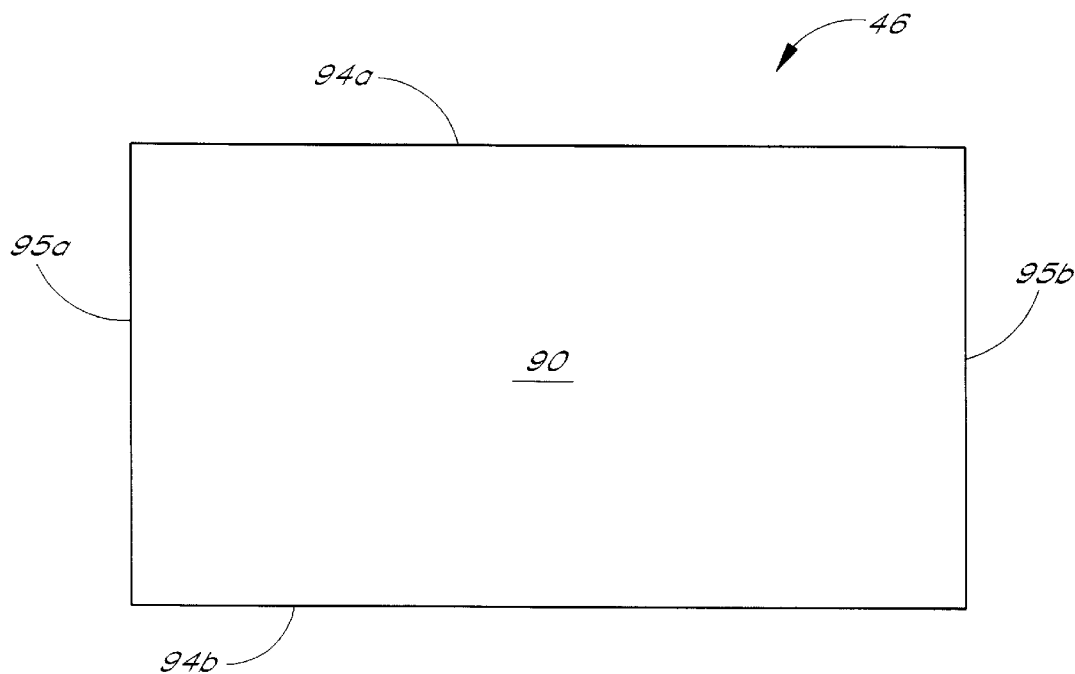
FIG. 5 is a top view of a waveguide of the illumination device.
Figure 6A:
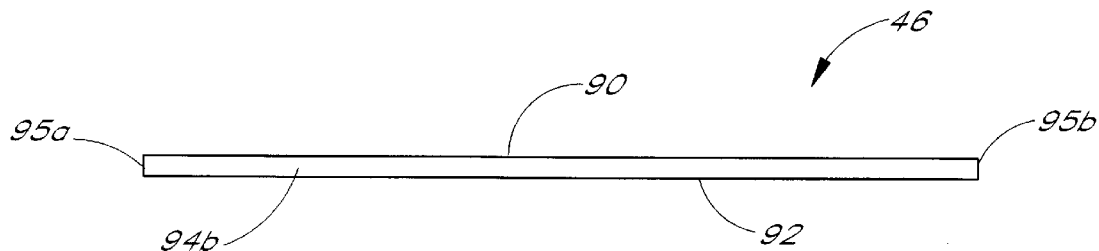
FIG. 6A is a side view of the waveguide of FIG. 5.
Figure 6B:
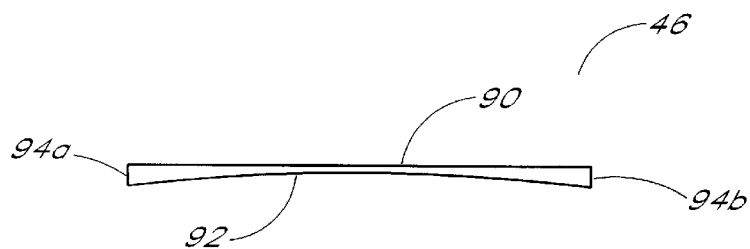
FIG. 6B is an end view of the waveguide of FIG. 5.

FIGS. 5, 6A, and 6B are top, side, and end views, respectively, of the waveguide 46. In the illustrated embodiment, the waveguide 46 is substantially rectangular-shaped and includes a top surface 90 and an opposed bottom surface 92. The bottom surface 92 of the waveguide 46 is curved so as to form a longitudinal indentation or trough in the center of the waveguide extending in a direction parallel to the first and second edges of the waveguide. As best shown in FIG. 6B, the curvature of the bottom surface 92 is smooth and continuous so as to define an area of reduced thickness in the center portion of the waveguide 46, and provide an air space between the bottom surface 52 and the top surface 57 of the light guide 44.

Such air gap provides a low index substance (i.e., air) along the bottom surface 92 to enhance the waveguiding function of the guide 46. The bottom surface 92 follows a geometric contour that redirects light propagating in the waveguide between the top surface 90 and the bottom surface 92, so that more of the light exits the center portion of the waveguide, thereby providing more uniform illumination from the top surface 90 of the waveguide 46.

A pair of opposed side surfaces 94a and 94b (referred to collectively as "side surfaces 94") and a pair of opposed end surfaces 95a and 95b (referred to collectively as "end surfaces 95") connect the top surface 90 to the bottom surface 92 and define the periphery or perimeter of the waveguide 46. The distance between the top and bottom surfaces 90 and 92 along the side surfaces 94 is substantially equal to the height of the post-shaped guide members 60, which in the disclosed embodiment is approximately 0.067 at the side surfaces 94. Preferably, the waveguide 46 is sized to be positioned on the light guide 44 between the guide members 60 such that the side surfaces 94a and 94b abut the apexes 66a and 66b, respectively, of the guide members 60. The end surfaces 95 are preferably coated with a reflective material, such as described above with respect to the light guide 44.

The waveguide 46 is preferably comprised of a material that is transparent to light produced by the LEDs 50, such as a transparent polymeric material, and may be manufactured by various well-known methods, such as machining or injection molding. Preferred materials for the waveguide 46 are acrylic, polycarbonate, and silicone. Acrylic, which has an index of refraction of approximately 1.5, is scratch resistant and has a lower cost relative to polycarbonate. Polycarbonate, which has an index of refraction of approximately 1.59, has higher temperature capabilities than acrylic. Polycarbonate also has improved mechanical capabilities over acrylic. Silicone has a refractive index of approximately 1.43. Alternatively, the waveguide 46 may be formed by a set of diffusive reflective surfaces that enclose an optical cavity containing a light transmissive medium, such as air.

The waveguide may be injection molded to include v-shaped grooves that are configured to be positioned within the spaces 70 between the guide members 60. In such case, the LEDs may be butt coupled to the waveguide by a suitable coupling gel.

Figure 7:
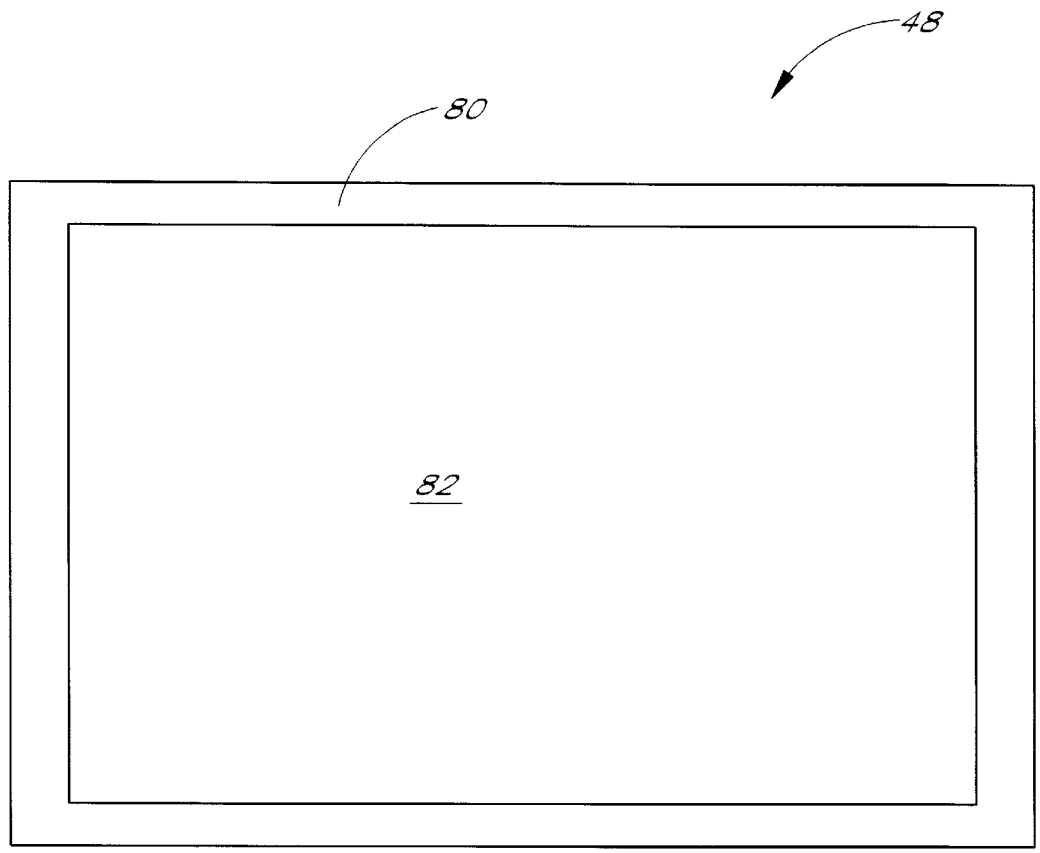
FIG. 7 is a top view of a cover of the illumination device.
Figure 8:
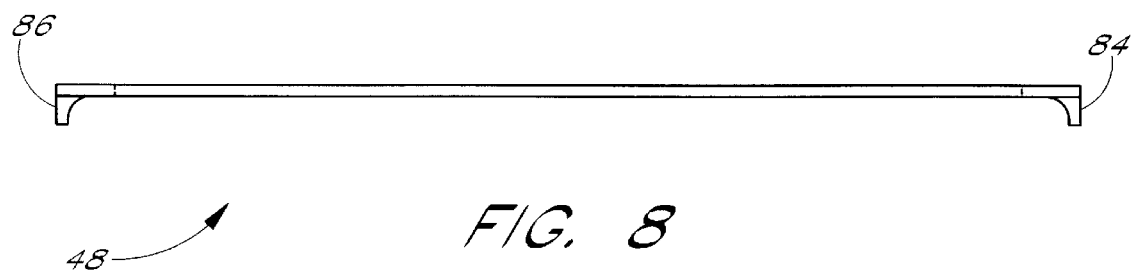
FIG. 8 is a side view of the cover of FIG. 7.

With reference to FIGS. 7 and 8, the cover 48 of the illumination device 40 comprises a frame member 80 that is substantially planar in configuration and sized to fit over the light guide 44. An aperture 82 extends through the frame member 80 so as to define an optical output area or illumination region through which light escapes from the illumination device 40 to thereby illuminate the LCD display 36, as described more fully below. In the illustrated embodiment, the aperture 82 is rectangular-shaped, which corresponds to the rectangular shape of the display 36 of the personal digital assistant 30. It will be appreciated, however, that the aperture 82 may define any of a wide variety of shapes and sizes depending upon the desired shape and size of the illumination region.

As best shown in FIG. 8, the illustrated embodiment of the cover 48 includes a pair of opposed end walls 84 and 86 that extend downwardly from opposite end edges of the frame member 80. The end walls 84 and 86 preferably define a distance therebetween that is slightly larger than the distance between the end edges 63 of the light guide 44. Accordingly, the light guide 44 may be positioned snugly between the end walls 84 and 86 of the cover 48. Each of the walls 84 and 86 extends perpendicularly from a top wall 85. Preferably, the interior surfaces formed by the walls 84, 85, and 86 are coated with the same diffusive reflective material as the surface 57 and the surfaces 65. Additionally, the end walls 84 and 86 are sized so that the top wall 85 abuts the tops of the post-shaped guide members 60.

Figure 9:
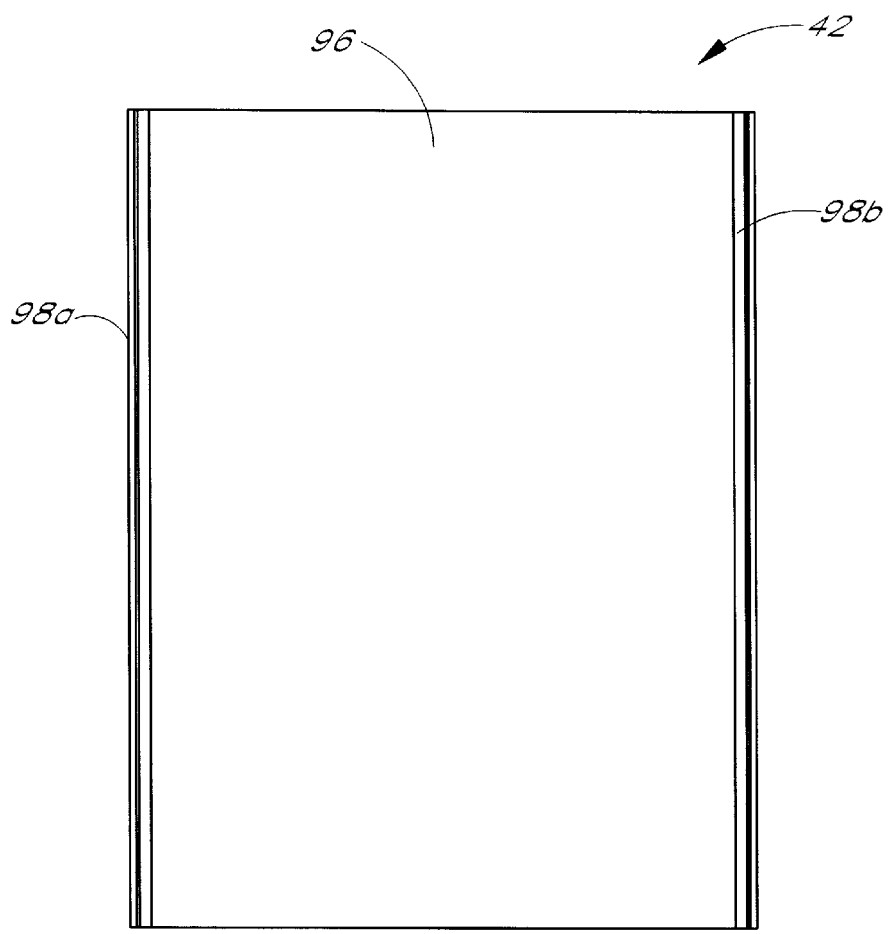
FIG. 9 is a top view of a heat sink of the illumination device.
Figure 10:
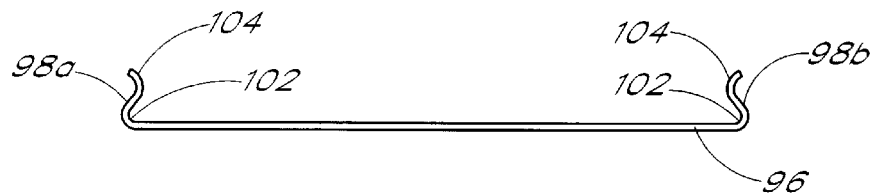
FIG. 10 is a side view of the heat sink of FIG. 9.

With reference to FIGS. 9 and 10, a preferred embodiment of the illumination device 40 further comprises the heat sink 42 which is configured to be coupled to the light guide 44, as described more fully below. In the illustrated embodiment, the heat sink 42 comprises a substantially flat base portion 96 and a pair of opposed side walls 98a and 98b (referred to collectively as "side walls 98") that extend upwardly along opposite end edges of the base portion 96. As best shown in FIG. 9, the base portion 96 of the heat sink 42 is substantially rectangular-shaped, and is approximately the same size as the planar member 56.

As shown in FIG. 10, the side walls 98 are bent so as to define a pair of opposed concave portions 102 adjacent the intersections of the side walls 98 with the base portion 96 of the heat sink 42. A pair of opposed convex portions 104 of the end walls 98 are formed above the concave portions 102. The side walls 98a and 98b preferably define a space therebetween that is sized to snugly receive the light guide 44. The heat sink 42 preferably comprises a material that readily absorbs heat and that is highly heat conductive, such as copper.

Figure 11:
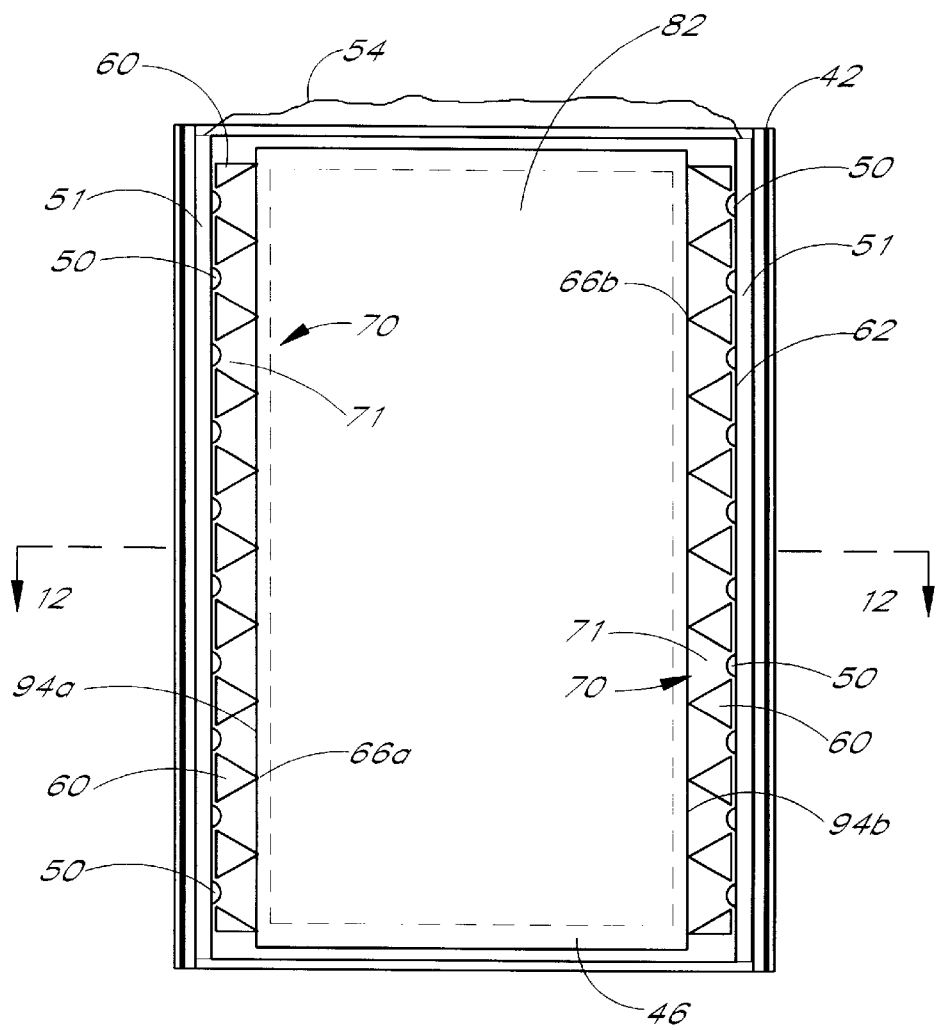
FIG. 11 is a top view of the illumination device.
Figure 12:
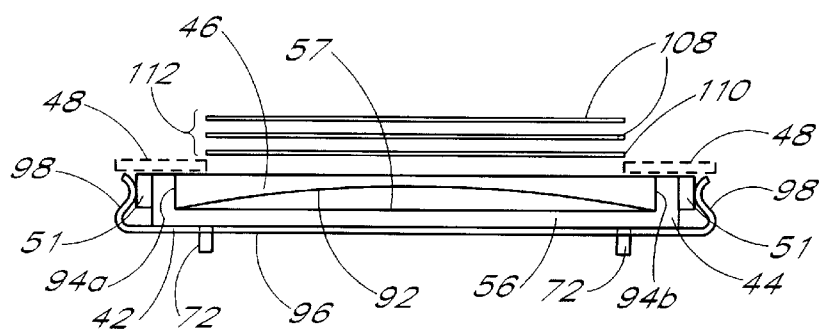
FIG. 12 is a cross-sectional view of the illumination device along line 12—12 of FIG. 11.

FIGS. 11 and 12 show the illumination device 40 in an assembled state. As best shown in FIG. 12, the light guide 44 is positioned within the heat sink 42 such that the planar member 56 of the light guide 44 is in a spaced parallel relationship to the base portion 96 of the heat sink 42. As best shown in FIG. 4, a set of legs 72 extend downwardly from the bottom surface 58 of the planar member 56. In the illustrated embodiment, two legs 72 are located near opposite corners of the planar member 56. However, the size, position, and number of legs 72 may be varied. With reference to FIG. 12, the legs 72 of the light guide 44 extend through apertures in the base portion 96 of the heat sink 42. The protruding ends of the legs 72 are used as reference points to facilitate alignment of the illumination device 40 during assembly.

With reference to FIGS. 11 and 12, an LED strip 51 is positioned between each of the side edges 62 of the light guide 44 and each of the side walls 98 of the heat sink 44. The LED strips 51 are preferably oriented so that an LED 50 is disposed at each of the mouths 71 of the spaces 70 between the guide members 60. The bent side walls 98 of the heat sink 42 causes the convex portions 104 (FIG. 10) of the side walls 98 to exert pressure against the LED strips 51 to thereby maintain a strong mechanical contact between the heat sink 42 and the LED strips 51. This facilitates the transfer of heat from the LEDs 50 to the heat sink 42. The pressure that the side walls 98 exert against the LED strips 51 is also transferred to the light guide 44 to thereby provide a slight biasing force of the guide members 60 on the waveguide 46 to inhibit the various components of the illumination device 40 from falling apart.

With reference to FIGS. 11 and 12, the waveguide 46 is mounted on the light guide 44 such that the bottom surface 92 of the waveguide 46 is juxtaposed with the top surface 57 of the light guide 44. As mentioned, the side surfaces 94a and 94b of the waveguide 46 preferably abut the apexes 66a and 66b, respectively, of the guide members 60. The cover 48 (shown in phantom lines) is mounted over the periphery of the waveguide 46 with the aperture 82 preferably aligned midway between the apexes 66a and 66b.

In operation, the LEDs 50 are energized to introduce light into the waveguide 46. Preferably, the LEDs emit light having a wavelength in the range of 400 nm to 700 nm. The portion of the diffusive reflective top surface 57 between the diffusive reflective surfaces 65, together with the diffusive reflective interior surface of the top wall 85 of the frame 80, and the diffusive reflective side surfaces 65 of the guide members 60 form a series of diffusive reflective air filled cavities that confine the emitted light and inject it into the side surfaces 94 of the waveguide 46. Advantageously, the guide members 60 facilitate a uniform distribution of light from the point light sources into a peripheral portion (FIG. 13) of the waveguide 46, adjacent to the cavities.

Figure 13:
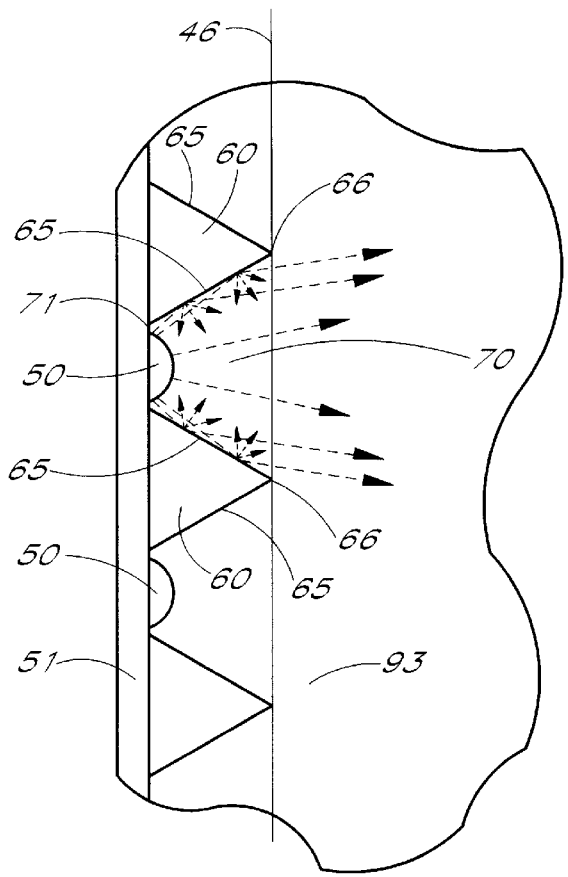
FIG. 13 is an enlarged top view of a portion of the light guide used with the illumination device.

FIG. 13 is an enlarged top view of a pair of the guide members 60 with an LED 50 positioned at the mouth 71 of a cavity comprising a space 70 between the guide members 60. Light rays from the LED 50 are represented by dashed lines. As shown, light rays emitted laterally from the LED 50 impinge the diffusive reflective side surfaces 65 of the guide members 60. The angled side surfaces 65 reflect the light rays into the waveguide 46. This reflected light fills the regions between adjacent LEDs 50 to thereby provide a relatively uniform distribution of light injection from the LED 50 into the peripheral portion 93 of the waveguide 46. The plurality of LEDs 50 along the length of the side surfaces 94 of the waveguide 46 thus provide a more or less uniform illumination profile along the peripheral portion 93 of the waveguide 46 adjacent the cavities 70.

Once injected into the waveguide 46, the light is guided towards the center of the aperture 82. The diffusive reflective surfaces, including the diffusive reflective top surface 57 of the light guide 44 and the diffusive reflective end surfaces 95 of the waveguide 46, mix the light to facilitate a uniform distribution across the aperture 82. The light eventually achieves the correct angles of incidence to exit the waveguide 46 through the top surface 90 and out of the aperture 82 in the cover 48. As shown in FIG. 1B, the illumination device 40 is juxtaposed with the LCD display 36 so that the light exiting the illumination device 40 backlights the LCD display 36.

Figure 13A:
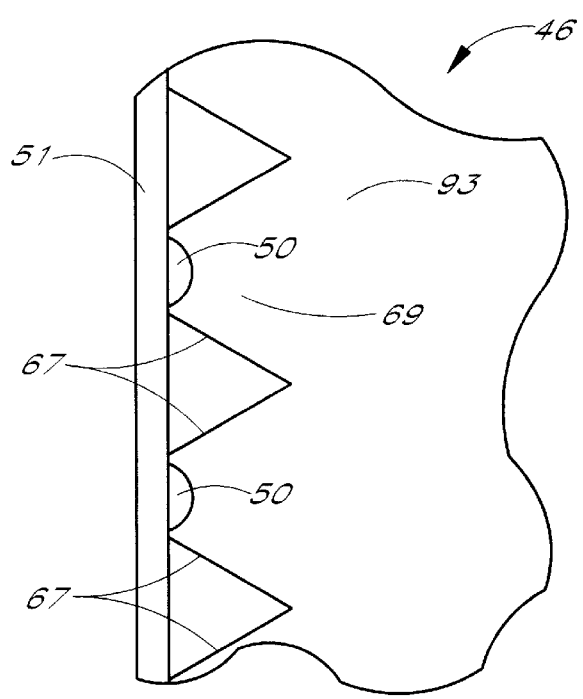
FIG. 13A is a fragmentary plan view of an alternative embodiment of the waveguide in which diffusive reflective cavities are formed by the waveguide material.

Referring to FIG. 13A, in another embodiment, the waveguide 46 may be configured to include v-shaped grooves. The edges of the waveguide 46 (between the top and bottom surfaces thereof) may be coated with a diffusive reflective material to form diffusive reflective surfaces 67 within the v-shaped grooves. The LEDs 60 may be recessed into respective notches in the waveguide on flats between the v-shaped grooves. The diffusive reflective surfaces 67 on the waveguide material provide the same function as the diffusive reflective surfaces 65 of the guide members 60 (discussed above), thereby permitting the guide members 60 to be eliminated if desired. The portions of the waveguide material between the v-shaped grooves thus provide a series of diffusive reflective cavities 69 which uniformly illuminate the peripheral portion 93 of the waveguide that is adjacent the cavities 69. Although formed of transparent solid material, the cavities 69 function in substantially the same manner as the air-filled cavities 70 shown in FIG. 13.

Referring to FIG. 12, the top surface 90 of the waveguide 46 may be covered with an angular spectrum restrictor 108 that restricts the output radiation pattern from the aperture 82 of the cover 48 to a predetermined range of angles (in this context, the term "spectrum" is used in the sense of an angular spectrum rather than a wavelength spectrum). The angular spectrum restrictor 108 comprises a planar microreplicated optical structure, such as a holographic diffuser, binary diffractive diffuser, or array of microlenses or prisms. In the preferred embodiment, the angular spectrum restrictor 108 comprises a brightness enhancing film (BEF) which, in addition to restricting the output spectrum, enhances the intensity of the illumination from the illumination device 40.

The BEF 108 is preferably placed in physical contact with a diffuser 110 to collectively form a light quality enhancing apparatus (LQE) 112. In FIG. 12, the thickness of and spacing between the BEF 108 and the diffuser 110 is shown only for clarity of illustration. Preferably, the diffuser 110 is disposed between the BEF 108 and the waveguide 46 and in contact with the waveguide 46. The diffuser 110 desirably removes the effect of residual nonuniformities, such as cosmetic imperfections, in the surfaces of the waveguide 46. The diffuser 110 may comprise a translucent material, typically a thin plastic surface or volume diffuser, both of which are characterized by very low absorption and minimum energy losses. The diffuser 110 may be supplemented or replaced with a groove or scratching pattern on the top surface 90 that is formed by abrading the top surface 90 of the waveguide 46 with an abrasive, such as sandpaper. The abrading is preferably non-uniform such that the density of the scratches or grooves increase with distance from the light-emitting diodes 50.

As mentioned above, the BEF 108 restricts output illumination within defined boundary lines and also increases the brightness of the light exiting the aperture 82. In the preferred embodiment, the BEF 108 is a commercially available thin film having linear pyramidal structures, such as 3M model 90/50 film. The BEF transmits only those light rays from the waveguide that satisfy certain incidence angle criteria with respect to the top surface 90 of the waveguide 46. All other light rays are reflected back into the waveguide 46 toward the bottom, side, or end surfaces 92, 94, and 95 respectively, where they are reflected. In effect, the reflected rays are "recycled" until they are incident on the BEF 108 at an angle which permits them to pass through the BEF 108.

As is well known, a BEF, such as the BEF 108, concentrates illumination within boundaries defined by a pair of mutually inclined planes (which in cross-section form a "V") and does not provide concentration in the orthogonal direction. In some applications of the invention, it is preferable to concentrate the illumination within two orthogonal directions, and for such applications, a second BEF oriented orthogonally to the first BEF, may be included. With two crossed BEFs, the emission from the waveguide will be within boundaries resembling a truncated inverted cone. As is conventional in the art, the boundaries are defined by the full-width, halfmaximum (FWHM) of the optical intensity. By way of example, the boundaries of the cone may be inclined relative to a line normal to the top surface 90 by an angle of no more than about 35 degrees, in which case the illumination will be visible only within viewing angles of 35 degrees or less.

As mentioned, the heat sink 42 greatly improves the efficiency of the illumination device 40 by absorbing and dispersing heat generated by the LEDs 50. Light-emitting diodes typically undergo a significant decrease in light output over time after being initially energized. This is a result of the relatively high build-up of heat in the LED, which is caused by the relatively small thermal mass of a typical LED. FIG. 13 is a graph illustrating the light emitted by the illumination device 40 as a function of time. The solid line represents the light output of the illumination device utilized without the heat sink 40. After an initial illumination of $I_o$ at energization, the LED typically undergoes a 25% decrease in light output after 60 seconds. The light output of the LED then gradually decreases over time until it reaches equilibrium after about 5 minutes with no heat sinking.

Figure 14:
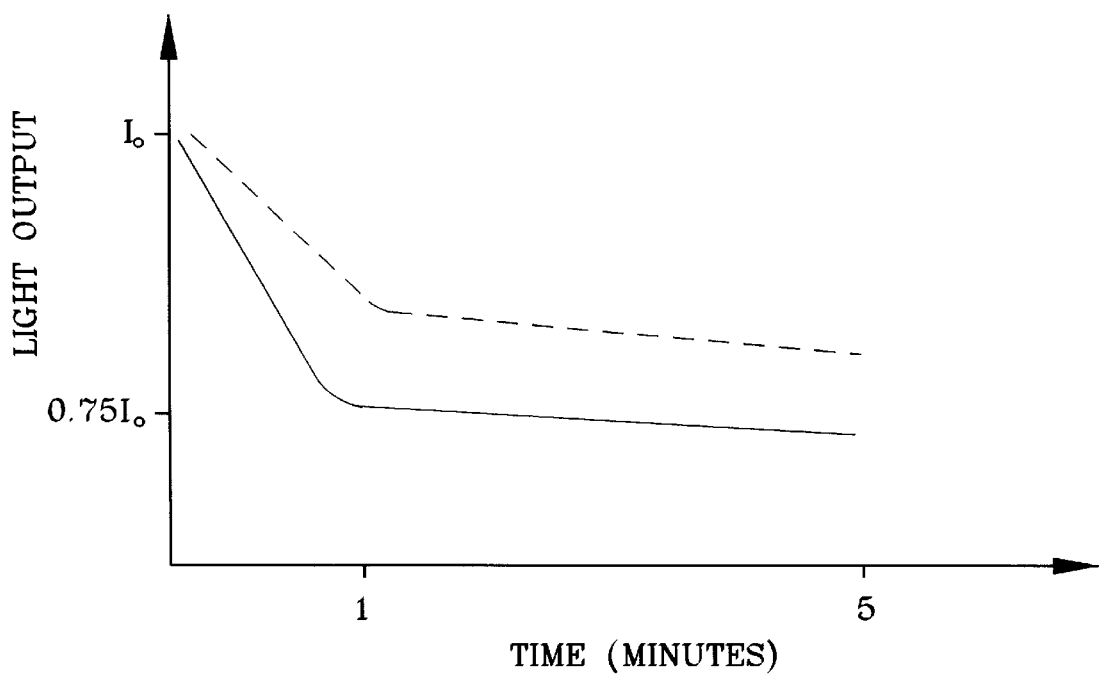
FIG. 14 is a graph illustrating the increased efficiency of the illumination device incorporating the heat sink component.

The dashed line of FIG. 14 represents the light output of the illumination device 40 when used with the heat sink 42. Advantageously, the heat sink 42 absorbs heat from the LEDs so that the there is significantly less decrease in light output over time. The thermal equilibrium of the illumination device 40 is thus improved when the heat sink 42 is incorporated in the illumination device 40. Typically, a device utilizing the heat sink 42 provides a 25% to 30% increase in light output (measured in foot lamberts or candela per square meter) over an illumination device 40 that does not use the heat sink 42.

Although the foregoing description of the preferred embodiment of the preferred invention has shown, described, and pointed out certain novel features of the invention, it will be understood that various omissions, substitutions, and changes in the form of the detail of the apparatus as illustrated as well as the uses thereof, may be made by those skilled in the art without departing from the spirit of the present invention. Consequently, the scope of the present invention should not be limited by the foregoing discussion, which is intended to illustrate rather than limit the scope of the invention.

What is claimed is:

1. An illumination device, comprising:
   a waveguide having a peripheral portion;
   a series of point light sources mounted in spaced relationship adjacent the peripheral portion of the waveguide;
   a series of diffusive reflective surfaces adjacent the peripheral portion of the waveguide and between pairs of said point light sources, the diffusive reflective surfaces oriented relative to the series of point light sources and the waveguide so as to introduce light in regions of said waveguide between pairs of said point light sources whereby the peripheral portion of the waveguide is substantially uniformly illuminated.

2. The device of claim 1, wherein the diffusive reflective surfaces comprise a series of posts mounted in a spaced relationship adjacent the peripheral portion of the waveguide.

3. The device of claim 2, wherein each of the posts have triangular cross-section.

4. The device of claim 1, wherein the diffusive reflective surfaces are oriented at an angle of approximately 45° relative to the peripheral portion of the waveguide.

5. The device of claim 1, wherein the series of point light sources comprise light-emitting diodes mounted on an electrical-conductive strip of material.

6. The device of claim 1, additionally comprising a heat sink coupled to the series of point light sources.

7. The device of claim 1, wherein the waveguide comprises a top surface having an optical output area through which light exits the waveguide.

8. The device of claim 7, additionally comprising an angular spectrum restrictor proximate the top surface of the waveguide to enhance the brightness of the light exiting the waveguide.

9. The device of claim 8, additionally comprising a diffuser between the angular spectrum restrictor and the top surface of the waveguide.

10. The device of claim 9, wherein the diffuser comprises a series of scratches arranged in a non-uniform pattern on the top surface of the waveguide.

11. The device of claim 1, wherein the diffusive reflective surfaces have a reflectivity of at least approximately 90%.

12. An illumination device, comprising:
    a series of diffusive reflective optical cavities formed by diffusive reflective surfaces, each of said cavities having an entry mouth sized to receive a point light source and an exit mouth;
    a point light source mounted at each of the entry mouths;
    a pair of surfaces forming a waveguide, said waveguide having a peripheral portion extending along the exit mouths of said diffusive reflective optical cavities.

13. The device of claim 12, wherein the diffusive reflective surfaces comprise posts mounted adjacent the peripheral edge of the waveguide.

14. The device of claim 13, wherein the posts have a triangular-shaped cross-section.

15. The device of claim 12, additionally comprising a heat sink coupled to the point light sources.

16. The device of claim 12, wherein each of the optical cavities are funnel-shaped such that the exit mouth is larger than the entry mouth.

17. An illumination device, comprising:
    an optical cavity having an output aperture;
    a series of diffusive reflective optical cavities each substantially smaller than said optical cavity and having an exit mouth disposed along a side of said optical cavity;
    a series of point sources of light mounted to emit light into said series of diffusive reflective optical cavities, respectively, whereby light is injected from said exit mouths into a peripheral portion of said optical cavity.

18. The device of claim 17, wherein said optical cavity comprises a waveguide.

19. The device of claim 18, wherein said series of diffusive reflective optical cavities are formed by a series of posts disposed in a side-by-side relationship along said side of said optical cavity.

20. The device of claim 17, wherein the point sources of light comprise light-emitting diodes.

21. An illumination device, comprising:
    an optical cavity formed by diffusive reflective surfaces, said cavity having an output region through which light exits said cavity;
    a plurality of guide members formed by diffusive reflective surfaces, the guide members positioned along a periphery of the optical cavity such that spaces are defined between each of the guide members, each of the spaces having an entry mouth spaced from the periphery of the optical cavity and an exit mouth wider than the entry mouth and adjacent the periphery of the optical cavity; and
    a light source mounted at the entry mouths of each of the spaces between the guide members.

22. The device of claim 21, additionally comprising an angular spectrum restrictor proximate the output region of the optical cavity.

23. The device of claim 22, additionally comprising a diffuser adjacent the angular spectrum restrictor.

24. The device of claim 21, wherein each of the guide members have a triangular cross-section.

25. The device of claim 21, wherein the guide members comprise a set of diffusive reflective surfaces disposed at an angle of approximately 45° relative to a peripheral edge of the waveguide.

26. A method of illuminating a waveguide, comprising:
confining light emitted by a first point light source by using diffusive reflective surfaces to reflect the light;
repeating said confining for additional point light sources;
spatially arranging all of the confined light to substantially uniformly illuminate a peripheral portion of said waveguide.

27. The method of claim 26, additionally comprising coupling a heat sink to the point light sources to absorb heat therefrom.

28. The method of claim 26, additionally comprising orienting the diffusive reflective surfaces at an angle of approximately 45° relative to the edge of the waveguide.

29. The method of claim 26, additionally comprising mounting the point light sources in a side-by-side, spaced relationship along the peripheral portion of the waveguide.

* * * * *

(12) EX PARTE REEXAMINATION CERTIFICATE (8210th)
United States Patent
Pelka et al.

(10) Number: US 6,134,092 C1
(45) Certificate Issued: May 10, 2011

(54) ILLUMINATION DEVICE FOR NON-EMISSIVE DISPLAYS

(75) Inventors: David G. Pelka, Los Angeles, CA (US); John M. Popovich, Del Mar, CA (US); Thomas W. Dowland, Jr., Fountain Valley, CA (US)

(73) Assignee: Chimei Innolux Corporation, Chu-nan Site, Hsinchu Science Park, Chu-Nan, Miao-Li County (TW)

Reexamination Request:
No. 90/009,629, Dec. 10, 2009

Reexamination Certificate for:
Patent No.: 6,134,092
Issued: Oct. 17, 2000
Appl. No.: 09/057,199
Filed: Apr. 8, 1998

(51) Int. Cl.
*F21V 8/00* (2006.01)

(52) U.S. Cl. .......................................... 361/31; 361/800
(58) Field of Classification Search ...................... 362/26
See application file for complete search history.

(56) References Cited

U.S. PATENT DOCUMENTS

| 5,113,232 A | 5/1992 | Itoh et al. |
| 5,410,453 A | 4/1995 | Ruskouski |
| 5,723,868 A | 3/1998 | Hammond, Jr. et al. |
| 5,786,665 A | 7/1998 | Ohtsuki et al. |
| 5,857,767 A | 1/1999 | Hochstein |
| 6,043,591 A | 3/2000 | Gleckman |

FOREIGN PATENT DOCUMENTS

| JP | 4-085588 A | 3/1992 |
| JP | 5-011718 A | 1/1993 |
| JP | 6-214230 A | 8/1994 |
| JP | 6-342161 A | 12/1994 |
| JP | 8-315621 A | 11/1996 |
| JP | 9-21916 A | 1/1997 |
| JP | 9-34371 A | 2/1997 |
| JP | 9-51124 | 2/1997 |

*Primary Examiner* — Christina Y Leung

(57) ABSTRACT

An illumination device comprises a waveguide having a peripheral edge. A series of point light sources are mounted in spaced relationship adjacent a peripheral portion of the waveguide. A series of diffusive reflective surfaces, preferably formed by posts, are disposed adjacent the peripheral portion of the waveguide, between pairs of the point light sources. The diffusive reflective surfaces are oriented relative to the series of point light sources and the waveguide so as to introduce light into regions of the waveguide between pairs of the point light sources, whereby the peripheral portion of the waveguide is substantially uniformly illuminated.

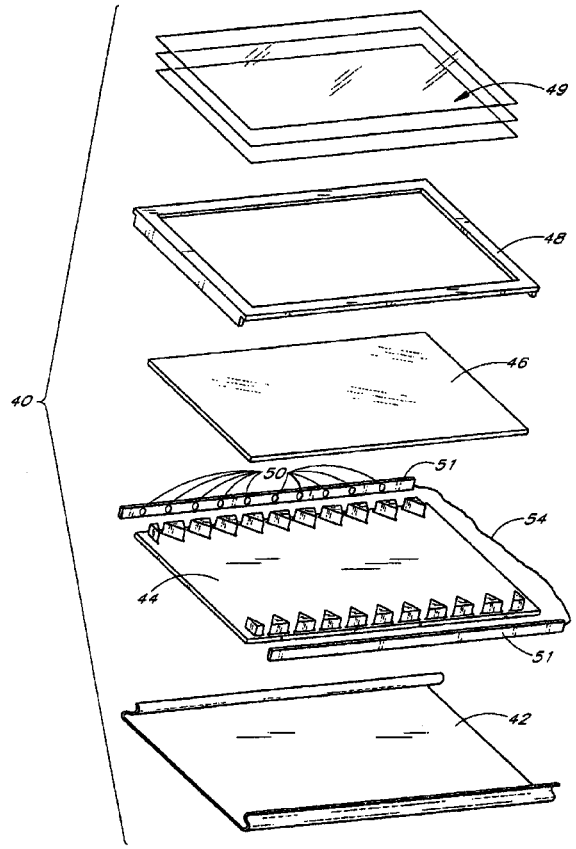

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 5-8, 11, 12, 15-18, 20-22, 26, 27 and 29 is confirmed.

Claims 2-4, 9, 10, 13, 14, 19, 23-25 and 28 were not reexamined.

\* \* \* \* \*

(12) EX PARTE REEXAMINATION CERTIFICATE (10181st)
United States Patent
Pelka et al.

(10) Number: US 6,134,092 C2
(45) Certificate Issued: Jun. 3, 2014

(54) ILLUMINATION DEVICE FOR NON-EMISSIVE DISPLAYS

(75) Inventors: David G. Pelka, Los Angeles, CA (US);
John M. Popovich, Del Mar, CA (US);
Thomas W. Dowland, Jr., Fountain Valley, CA (US)

(73) Assignee: Chimei Innolux Corporation, Chu-Nan Site, Hsinchu Science Park, Chu-Nan, Miao-Li County (TW)

Reexamination Request:
No. 90/012,051, Dec. 15, 2011

Reexamination Certificate for:
Patent No.: 6,134,092
Issued: Oct. 17, 2000
Appl. No.: 09/057,199
Filed: Apr. 8, 1998

Reexamination Certificate C1 6,134,092 issued May 10, 2011

(51) Int. Cl.
*F21V 8/00* (2006.01)

(52) U.S. Cl.
USPC ............................................ 361/31; 361/800

(58) Field of Classification Search
None
See application file for complete search history.

(56) References Cited

To view the complete listing of prior art documents cited during the proceeding for Reexamination Control Number 90/012,051, please refer to the USPTO's public Patent Application Information Retrieval (PAIR) system under the Display References tab.

*Primary Examiner* — Jason Proctor

(57) ABSTRACT

An illumination device comprises a waveguide having a peripheral edge. A series of point light sources are mounted in spaced relationship adjacent a peripheral portion of the waveguide. A series of diffusive reflective surfaces, preferably formed by posts, are disposed adjacent the peripheral portion of the waveguide, between pairs of the point light sources. The diffusive reflective surfaces are oriented relative to the series of point light sources and the waveguide so as to introduce light into regions of the waveguide between pairs of the point light sources, whereby the peripheral portion of the waveguide is substantially uniformly illuminated.

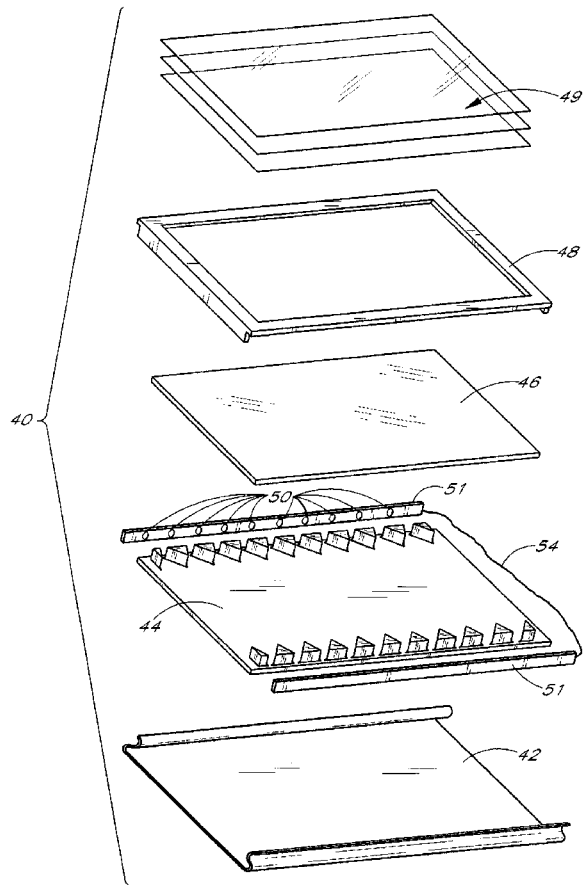

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 5-8, 11-12, 15-16, 18, 26-27 and 29 is confirmed.

Claims 17 and 20-22 are cancelled.

New claims 30-34 are added and determined to be patentable.

Claims 2-4, 9, 10, 13, 14, 19, 23-25 and 28 were not reexamined.

*30. The device of claim 1, wherein said diffusive reflective surfaces are positioned to transmit light received from said point light sources into said waveguide.*

*31. The device of claim 12, wherein said diffusive reflective surfaces forming each diffusive reflective optical cavity are positioned to transmit light received from the point light source mounted at the entry mouth of the cavity into said waveguide.*

*32. The device of claim 17, wherein said diffusive reflective optical cavities are positioned to transmit light received from the point sources of light into said optical cavity having an output aperture.*

*33. The device of claim 21, wherein said guide members are positioned to transmit light received from said light sources into said optical cavity.*

*34. The method of claim 26, additionally comprising: positioning the diffusive reflective surfaces such that they transmit light received from said point light sources into said waveguide.*

\* \* \* \* \*